United States Patent Office

3,093,678
PRODUCTION OF 1-CARBETHOXY-2,6,6-TRIMETHYL-2-CYCLOHEXEN-4-ONE
Harry Rubinstein, Bethlehem, and Remsen T. Schenk, Bangor, Pa., assignors to Keystone Chemurgic Corporation, Bethlehem, Pa., a corporation of Pennsylvania
No Drawing. Filed Nov. 1, 1961, Ser. No. 149,195
3 Claims. (Cl. 260—468)

This invention relates to an improved process for the preparation of 1-carbethoxy-2,6,6-trimethyl-2-cyclohexen-4-one, hereinafter referred to as "carbethoxy isophorone." Said carbethoxy isophorone is a very good solvent for lacquers, vinyl resins and cellulose esters.

Carbethoxy isophorone has heretofore been prepared only by the base-catalyzed condensation of aceto-acetic ester with isopropylidene acetoacetic ester, a lengthy process which involves the use of metallic sodium and calls for large volumes of absolute alcohol. Isopropylidene acetoacetic ester itself has been obtained only by the condensation of acetoacetic ester with acetone under the influence of anhydrous hydrogen chloride. This, too, is a long drawn-out, tedious method involving costly reagents and leading to poor yields which must be separated from large amounts of by-products.

The process of our invention overcomes all these difficulties, in that it involves but a single step, is complete in a relatively short time, employs only comparatively cheap raw materials, and leads to greatly improved yields of the desired product, with a minimum of by-products.

In our process, acetoacetic ester is caused to condense with acetone, diacetone alcohol or mesityl oxide, in the presence of boron trifluoride. The boron trifluoride may be introduced as a gas, or as a complex with ethyl ether. Approximately one mole of $BF_3$ is employed for each mole of ketonic reactant (acetone, mesityl oxide or diacetone alcohol).

No solvent is necessary in this reaction, though one may be used if desired. Various inert polar liquids are suitable. The best results are obtained with unsubstituted lower aliphatic or alicyclic ethers having up to six carbon atoms in the molecule. Specific examples include the following: ethyl ether, propyl ether, tetrahydrofurane, dioxane and dimethoxyethane. An excess of one of the liquid reactants may also serve as a solvent with excellent results.

We may carry out the condensation of our invention in the temperature range from $-20$ to $+30°$ C., for periods varying from 5 hours to 7 days. Generally speaking, the time required varies inversely as the temperature. Optimum conditions in most cases are a temperature between $0°$ and $+10°$ C. for 2 to 3 days.

The reaction apparently involves the condensation of one molecule of acetoacetic ester with two molecules of acetone. Since a molecule of boron trifluoride is required for each molecule of ketone employed, it is somewhat more economical to choose as starting material a dimer of acetone, such as the linear condensation products, diacetone alcohol and mesityl oxide. The amount of catalyst called for is thereby halved, and losses due to the relatively high volatility of acetone are eliminated.

The following examples will serve to illustrate the process of our invention.

Example 1

In a 1-liter flask surrounded by crushed ice is placed 130 gm. (1 mole) acetoacetic ester and 116 gm. (2 moles) acetone. The mixture is stirred until the internal temperature has fallen to $5°$ C. There is then slowly added, with stirring, 285 gm. (2 moles) boron trifluoride etherate (47% $BF_3$) at such a rate that the internal temperature does not rise above $10°$ C. The resulting mixture is held at $0-10°$ C. for three days, then poured over ice with efficient mixing. Two hundred gm. of sodium carbonate is added, in small portions, to the resulting mixture, and when the evolution of carbon dioxide is complete, the aqueous phase is extracted several times with ether. The combined extracts are dried over potassium carbonate, the ether is evaporated, and the residue is fractionally distilled under reduced pressure. The first portion, which comes over at $45-65°$ C. under 3 mm. of mercury, is recovered acetoacetic ester, 39 gm. This is followed by a small intermediate cut. The main fraction, 59 gm. of 1-carbethoxy-2,6,6-trimethyl-2-cyclohexen-4-one, $n_D^{23}$ 1.4783–1.4790, distills at $115–117°$ C. under 2.3 mm. of mercury. The conversion is thus 28% and the yield, corrected for recovered acetoacetic ester, is 40%.

Example 2

The procedure of Example 1 is followed with the substitution of 98 gm. mesityl oxide for the acetone and the use of only 142 gm. boron trifluoride etherate. There is obtained 57 gm. carbethoxy isophorone and 35 gm. recovered acetoacetic ester.

Example 3

The procedure of Example 2 is followed with the substitution of 116 gm. diacetone alcohol for the mesityl oxide. There is obtained 20 gm. carbethoxy isophorone, and 67 gm. acetoacetic ester is recovered.

Example 4

In a 1-liter flask surrounded by crushed ice is placed 130 gm. (1 mole) acetoacetic ester, 116 gm. (2 moles) acetone and 100 cc. anhydrous ethyl ether. When the internal temperature has fallen to $5°$ C. or below there is passed into the stirred mixture a stream of gaseous boron trifluoride at a rate such that the temperature is maintained between 0 and $10°$ C. Introduction of the catalyst is continued until the solution is saturated with the gas. The reaction mixture is then held at $0–10°$ C. for 2–3 days. The product, 1-carbethoxy-2,6,6-trimethyl-2-cyclohexen-4-one, is isolated in the manner described in Example 1.

Example 5

The procedure of Example 4 is followed with the substitution of 116 gm. of diacetone alcohol for the acetone.

Example 6

The procedure of Example 4 is followed with the substitution of 98 gm. mesityl oxide for the acetone and the use of only 50 cc. anhydrous ethyl ether.

Example 7

The procedures of Examples 4 and 5 are followed, using 100 cc. of anhydrous propyl ether in place of the same volume of anhydrous ethyl ether.

Example 8

The procedure of Example 6 is followed, using 50 cc. of anhydrous propyl ether in place of the same volume of anhydrous ethyl ether.

Example 9

The procedures of Examples 4 and 5 are followed using 100 cc. tetrahydrofurane in place of the same volume of anhydrous ethyl ether.

Example 10

The procedure of Example 6 is followed, using 50 cc. of tetrahydrofurane in place of the same volume of anhydrous ethyl ether.

Example 11

The procedures of Examples 4 and 5 are followed, using 100 cc. anhydrous dioxane in place of the same volume of anhydrous ethyl ether.

Example 12

The procedure of Example 6 is followed, using 50 cc. anhydrous dioxane in place of the same volume of anhydrous ethyl ether.

Example 13

The procedures of Examples 4 and 5 are followed, using 100 cc. dimethoxyethane in place of the same volume of anhydrous ethyl ether.

Example 14

The procedure of Example 6 is followed, using 50 cc. dimethoxyethane in place of the same volume of anhydrous ethyl ether.

While we have described our invention in terms of certain preferred examples, these have been presented by way of illustration and not of limitation. It will be obvious to those skilled in the art that various modifications may be made in the materials employed and the manner of their processing, without departing from the spirit of the invention and the scope of the claims.

Having thus described our invention, we claim:

1. The process for the production of 1-carbethoxy-2,6,6-trimethyl-2-cyclohexen-4-one which comprises the condensation of ethyl acetoacetate with a ketone selected from the group consisting of acetone, diacetone alcohol and mesityl oxide, at a temperature within the range of about $-20°$ C. to about $+30°$ C. for a period of time within the range of about 5 hours to 7 days in the presence of a fluoride of boron selected from the group consisting of boron trifluoride and boron trifluoride etherate.

2. The process for the production of 1-carbethoxy-2,6,6-trimethyl-2-cyclohexen-4-one which comprises the condensation of ethyl acetoacetate with a ketone selected from the group consisting of acetone, diacetone alcohol and mesityl oxide, at a temperature within the range of about $-20°$ C. to about $+30°$ C. for a period of time within the range of about 5 hours to 7 days in the presence of a fluoride of boron selected from the group consisting of boron trifluoride and boron trifluoride etherate and an ether selected from the group consisting of unsubstituted lower aliphatic and alicyclic ethers having from 2 to 6 carbon atoms in the molecule thereof.

3. The process of claim 1 further characterized by the presence of an ether having from 2 to 6 carbon atoms.

No references cited.